(12) United States Patent
Steen et al.

(10) Patent No.: US 7,487,025 B2
(45) Date of Patent: Feb. 3, 2009

(54) AUTOMATIC GEARSHIFTING PROCESS FOR A VEHICLE WITH ENGAGED COUPLING-DEPENDENT POWER TAKE OFF AND AUTOMATIC DISENGAGEMENT PROCESS OF A COUPLING-DEPENDENT POWER TAKE OFF

(75) Inventors: Marcus Steen, Angered (SE); Svante Karlsson, Västra Frölunda (SE); Erik Lauri, Mölndal (SE)

(73) Assignee: Volvo Lastvagnor AB, Gothenburg (SE)

( * ) Notice: Subject to any disclaimer, the term of this patent is extended or adjusted under 35 U.S.C. 154(b) by 177 days.

(21) Appl. No.: 11/419,512

(22) Filed: May 22, 2006

(65) Prior Publication Data

US 2006/0241840 A1 Oct. 26, 2006

Related U.S. Application Data

(63) Continuation of application No. PCT/SE2004/001926, filed on Dec. 17, 2004.

(30) Foreign Application Priority Data

Dec. 17, 2003 (SE) .................................... 0303446

(51) Int. Cl.
*G06F 17/00* (2006.01)

(52) U.S. Cl. ............................ 701/51; 701/55; 477/107; 74/340

(58) Field of Classification Search .................. 701/70, 701/55, 51, 53, 87; 91/473; 180/337, 252; 477/15, 31, 34, 172, 109, 107; 192/3.51, 192/137; 74/11, 15.8, 331, 340; 475/72

See application file for complete search history.

(56) References Cited

U.S. PATENT DOCUMENTS

| 4,159,623 | A | * | 7/1979 | McReynolds | .............. 60/39.15 |
| 5,469,840 | A | * | 11/1995 | Tanii et al. | .................. 600/117 |
| 5,971,888 | A | | 10/1999 | Goode | |

(Continued)

FOREIGN PATENT DOCUMENTS

JP          04351355 A   * 12/1992

(Continued)

OTHER PUBLICATIONS

Robust baud rate blind equalization for ATSC DTV receivers; Wilson, T.G.B.; Information, Communications & Signal Processing, 2007 6th International Conference on; Dec. 10-13, 2007 pp. 1-5; Digital Object Identifier 10.1109/ICICS.2007.4449698.*

(Continued)

*Primary Examiner*—Cuong H Nguyen
(74) *Attorney, Agent, or Firm*—WRB-IP LLP

(57) ABSTRACT

An automatic gearshifting process and/or disengagement process of a coupling-dependent power take off for a vehicle with the power take off engaged and when the vehicle is in motion. The power tapping at the power take off is minimized before a gearshift and/or disengagement of the claw clutch of the power take off takes place. One advantage is that gearshifting can be realized with engaged coupling-dependent power take off. Comfort is increased and coupling teeth wear is minimized, whilst, at the same time, a gear and the claw clutch of the power take off are able to be securely disengaged.

8 Claims, 2 Drawing Sheets

U.S. PATENT DOCUMENTS

| | | | |
|---|---|---|---|
| 6,080,081 | A | 6/2000 | Sauermann et al. |
| 6,926,632 | B2* | 8/2005 | Brown ..................... 474/35 |
| 2003/0153426 | A1* | 8/2003 | Brown ..................... 475/210 |
| 2004/0060758 | A1* | 4/2004 | Miguchi .................. 180/170 |
| 2005/0125135 | A1* | 6/2005 | Fujioka et al. ............ 701/70 |
| 2005/0211526 | A1* | 9/2005 | Averill et al. ............ 192/48.3 |
| 2005/0261108 | A1* | 11/2005 | Kuhstrebe et al. ......... 477/39 |
| 2005/0288149 | A1* | 12/2005 | Kuhstrebe et al. ......... 477/97 |
| 2006/0005647 | A1* | 1/2006 | Braford et al. ............ 74/335 |
| 2006/0006042 | A1* | 1/2006 | Koenig ................... 192/113.3 |
| 2006/0006043 | A1* | 1/2006 | Koenig et al. ............ 192/113.3 |
| 2006/0009326 | A1* | 1/2006 | Stefina ................... 477/127 |
| 2006/0037422 | A1* | 2/2006 | Kuhstrebe et al. ......... 74/340 |
| 2006/0101933 | A1* | 5/2006 | Koenig et al. ............ 74/333 |
| 2006/0183599 | A1* | 8/2006 | Steen et al. .............. 477/166 |
| 2006/0207655 | A1* | 9/2006 | Xiang et al. ............ 137/118.02 |
| 2006/0241840 | A1* | 10/2006 | Steen et al. .............. 701/51 |
| 2006/0243513 | A1* | 11/2006 | Tsuji .................... 180/252 |
| 2007/0105680 | A1* | 5/2007 | Ulbrich .................. 475/72 |
| 2007/0209456 | A1* | 9/2007 | Irikura et al. ............ 74/11 |
| 2007/0209457 | A1* | 9/2007 | Irikura et al. ............ 74/15.8 |
| 2007/0214906 | A1* | 9/2007 | Fahland et al. ............ 74/340 |
| 2007/0249455 | A1* | 10/2007 | Hasegawa et al. .......... 475/78 |
| 2008/0153666 | A1* | 6/2008 | Fahland et al. ............ 477/107 |

FOREIGN PATENT DOCUMENTS

| | | | | |
|---|---|---|---|---|
| JP | 05018445 | A | * | 1/1993 |
| JP | 06193732 | A | * | 7/1994 |
| JP | 07260628 | A | * | 10/1995 |
| JP | 08135779 | A | * | 5/1996 |
| JP | 2003247611 | A | * | 9/2003 |
| JP | 2005076875 | A | * | 3/2005 |
| JP | 2006038168 | A | * | 2/2006 |
| JP | 2006214514 | A | * | 8/2006 |
| WO | 0005023 | A2 | | 2/2000 |
| WO | 2004030973 | A1 | | 4/2004 |

OTHER PUBLICATIONS

Table of contents; Industrial Electronics Society, 2004. IECON 2004. 30th Annual Conference of IEEE; vol. 1, Nov. 2-6, 2004 pp. i-li; Digital Object Identifier 10.1109/IECON.2004.1433272.*

Table of Contents; Industrial Electronics Society, 2004. IECON 2004. 30th Annual Conference of IEEE; vol. 2, Nov. 2-6, 2004 pp. i-li; Digital Object Identifier 10.1109/IECON.2004.1431709.*

Modern technology impact on power usage in cement plants; Fujimoto, S.; Cement Industry Technical Conference, 1993. Record of Conference Papers., 35th IEEE; May 23-27, 1993 pp. 339-362; Digital Object Identifier 10.1109/CITCON.1993.296975.*

Design of the chained form manipulator; Woojin Chung; Nakamura, Y.; Robotics and Automation, 1997. Proceedings., 1997 IEEE International Conference on; vol. 1, Apr. 20-25, 1997 pp. 455-461 vol. 1; Digital Object Identifier 10.1109/ROBOT.1997.620079.*

A USN development strategy and demonstration results for propulsion and mechanical systems diagnostics, prognostics and health management; Hardman, W.; Hess, A.; Blunt, D.; Aerospace Conference, 2001, IEEE Proceedings; vol. 6, Mar. 10-17, 2001 pp. 3059-3068 vol. 6; Digital Object Identifier 10.1109/AERO.2001.931324.*

Development of a 2 degrees of freedom tracking system. Part II: controller design and implementation; Askari, I.; Hassan, S.A.; Faree, M.S.; Munawar, K.; Malik, M.B.; Abbas, T.; Emerging Technologies, 2005. Proceedings of the IEEE Symposium on Sep. 17-18, 2005 pp. 477-482; Digital Object Identifier 10.1109/ICET.2005.1558928.*

Robotic manipulators with remotely-actuated joints: implementation using drive-shafts and u-joints; Christoforou, E.G.; Tsekos, N.V.; Robotics and Automation, 2006. ICRA 2006. Proceedings 2006 IEEE International Conference on; May 15-19, 2006 pp. 2866-2871.*

Automotive Electronics; Flem, B.; Vehicular Technology Magazine, IEEE; vol. 1, Issue 2, 2006 pp. 44-47 Digital Object Identifier 10.1109/MVT.2006.283573.*

Effect of fuzzy logic-controlled SMES on damping turbine generator shaft torsional oscillations during unsuccessful reclosing Ali, M.H.; Park, M.; Yu, I.-K.; Murata, T.; Tamura, J.; Transmission and Distribution Conference and Exposition, 2008. T&D. IEEE/PES; Apr. 21-24, 2008 pp. 1-8; Digital Object Identifier 10.1109/TDC.2008.4517181.*

Coordination of fuzzy controlled braking resistor and optimal reclosing for damping shaft-torsional oscillations of synchronous generator;Ali, M.H.; Minwon Park; In-Keun Yu; Murata, T.; Tamura, J.;Electrical Machines and Systems, 2007. ICEMS. International Conference on;Oct. 8-11, 2007 pp. 1259-1264;Digital Object Identifier 10.1109/ICEMS.20.*

Analysis of the Failure in a Turbine-Generator Shaft; Xu Yanhui; He Renmu; Power System Technology, 2006. PowerCon 2006. International Conference on; Oct. 2006 pp. 1-6; Digital Object Identifier 10.1109/ICPST.2006.321589.*

The sensitivity analysis on torsional stresses and life expenditure of turbine-generator shaft; Qun Zhou; Yi Zhang; Jiayu Huang; Power Engineering Society Winter Meeting, 2000. IEEE; vol. 1, Jan. 23-27, 2000 pp. 197-201 vol. 1; Digital Object Identifier 10.1109/PESW.2000.849954.*

International Search Report from corresponding International Application PCT/SE2004/001926.

* cited by examiner

AUTOMATIC GEARSHIFTING PROCESS FOR A VEHICLE WITH ENGAGED COUPLING-DEPENDENT POWER TAKE OFF AND AUTOMATIC DISENGAGEMENT PROCESS OF A COUPLING-DEPENDENT POWER TAKE OFF

BACKGROUND AND SUMMARY

The present application is a continuation of International Application No. PCT/SE2004/001926, filed Dec. 17, 2004, which claims priority to SE 0303446-9, filed Dec. 17, 2003, both of which are incorporated by reference.

The present invention relates to a process for use in a motor vehicle. The processes relate to an automatic gearshifting process with the vehicle in driving mode and a simultaneously engaged coupling-dependent power take off and automatic disengagement of said power take off with the vehicle in driving mode.

The power take off is disposed on the transmission of the vehicle.

In order rationally to be able to handle the load on a goods vehicle, load handling equipment is required. The most common examples of such equipment are tipper and crane. Other commonly found examples are load changer, garbage handling unit, rotary cement mixer, rinsing unit, refrigeration unit, pumping equipment for various types of liquids and air compressor for loading or unloading bulk loads.

In order to utilize the drive force of the vehicle engine to also drive the load-handling equipment, a power take off is required. The drive force from the power take off can either be transmitted mechanically via toothed gearings and shafts, chains or belts, or hydraulically by the fitting of a hydraulic pump on the power take off.

Power take offs are divided into coupling-independent and coupling-dependent power take offs. The coupling-dependent power take offs are mounted on the transmission and are usually driven by the intermediate shaft of the transmission. This means that the power take off is coupling-dependent, i.e., the power take off stops when the coupling between the engine and transmission of the vehicle is disconnected. Depending on whether the transmission is equipped with splitter gear or not, the gearing between the engine and the power take off can be affected.

Automatic transmissions of the automated step-geared transmissions type have become more and more common in heavy-duty vehicles as microcomputer technology has been increasingly developed and has made it possible, with a control computer and a number of controllers, for example servo motors, to precision-regulate engine speed, engagement and disengagement of an automated clutch between engine and transmission, as well as the internal coupling members of the transmission, in such a way and in such relation to one another that smooth gearshift is always obtained at the right speed.

The advantage with this type of automatic transmission compared with a traditional automatic transmission constructed with planetary gear steps and with a hydrodynamic torque converter on the input side is, firstly, that, particularly where there is a question of use in heavy-duty vehicles, it is simpler and more robust and can be produced at substantially lower cost than the traditional automatic transmission and, secondly, that it has higher efficiency, which means potentially lower fuel consumption.

According to the prior art, for the above-stated type of automated step-geared transmission, coupling-dependent power take offs are suitable for load-handling equipment which is used when the vehicle is stationary or is being driven only in start gear, for example tipper units, cranes, load changers, pumps for emptying/filling from various containers and air compressors for loading or unloading bulk loads.

U.S. Pat. No. 6,080,081 shows examples of a coupling-dependent power take off arrangement in a vehicle with automated step-geared transmission. The document deals with the engagement of the power take off.

It is general practice, in transmissions, to equip a gear with means for preventing unwanted disengagement in the transfer of torque at the gear. This in order to prevent accidental disengagement of the engaged gear.

Such means can be configured such that the coupling teeth, belonging to coupling sleeves forming part of the gear and to the disconnectable coupling rings of the gear wheels, are tapered such that mutually facing V-shaped ends of the teeth on the coupling sleeves and the coupling rings are wider than parts of the teeth remote from said ends. It is customary to say that the flanks of the coupling teeth are configured with "cutbacks". An applied torque, for example the driving torque of the engine, on mutually contacting faces with cutbacks will produce a resultant force which acts in the direction of engagement of the coupling sleeve in order to stop an engaged gear from being accidentally disengaged. To enable an actuator disposed in the transmission to manage to disengage such a gear, torque applied to the gear must be reduced to the point where the actuator is able to disengage the gear. In order to minimize wear and possible damage, however, torquelessness is aimed for in the gear before it is disengaged. This can be effected, for example, by the transmission control unit, in a vehicle with an automatic step-geared transmission, ensuring that before the gear is disengaged the output torque of the engine is brought down to a minimum. Similar locking step to prevent accidental disengagement can also be found on coupling teeth in a claw clutch arranged to engage and disengage a coupling-dependent power take off in a vehicle. EP 1097018 shows examples of gear arrangements with cutbacks. As an alternative to cutbacks, the coupling teeth can be configured, for example, with more or less gradual variations in width, which width variations are meant to hook another when the engaging device is torque-loaded and thereby prevent accidental disengagement.

A problem with the prior art is that, in the case of an engaged coupling-dependent power take off, in which power is being tapped and in which a gear engaged in the transmission and equipped with means for preventing unwanted disengagement in the transfer of torque at the gear is simultaneously to be disengaged, the disengagement of the gear is unachievable, because of the said means.

Equivalent disengagement problems exist in power take offs in which the engaging/disengaging device of the power take off is constituted by a claw clutch with corresponding means for deterring accidental disengagement, i.e., through some form of coupling teeth with cutbacks. When a torque is applied to such power take offs through power tapping, a resultant force will therefore be generated, which acts in the direction of engagement of the claw clutch. According to the prior art, the vehicle needs to be stopped and the engine disconnected from the transmission in order to minimize the resultant force acting in the direction of engagement of the claw clutch and the power take off is thereby able to be disengaged.

Another problem with gearshifting with engaged coupling-dependent power take off is that the power tapping of the power take off affects the synchronization process. When so-called non-synchronized gears are engaged in automated step-geared transmissions, this problem can be circumvented by advanced controlling of the engine speed. In the case of engagement of so-called synchronized gears, the torque of the power take off will place load upon the synchronization, which produces increased wear and, for relatively large torque tappings, might also make synchronization impossible.

According to the prior art, the only way to ensure that the power take off does not load the transmission with any torque is by seeing to it that the power take off does not rotate. The driver of a vehicle with coupling-dependent power take off is therefore confined to using the coupling-dependent power take off when the vehicle is stationary or if a start gear is engaged, that the vehicle can be driven only in this gear whilst the power take off is engaged. Added to this are the difficulties in disengaging the power take off under load according to the above. In the case of gears and claw clutches without means for deterring accidental disengagement, comfort problems can also arise if the gear and/or the claw clutch are disengaged under torque load. These restrictions preclude the use of transmission-mounted coupling-dependent power take offs in a number of applications, including refrigeration/freezing transportations and driving rotary cement mixers.

There is therefore a need, in a vehicle equipped with power-dependent power take off and step-geared transmission, to be able to use the coupling-dependent power take off of the vehicle when the vehicle is in motion and with the facility to shift satisfactorily between all the gears of the vehicle over the full speed register of the vehicle and with the facility to disengage the power take off satisfactorily at any time during travel.

The first process according to the invention describes an automatic gearshifting process for a vehicle with engaged coupling-dependent power take off when the vehicle is in motion. The power take off is driven by an engine disposed in the vehicle via at least one clutch, which, in turn, is coupled to an automatic step-geared transmission in which there is disposed at least one intermediate shaft, used to drive the power take off. The transmission, the engine and the power take off are controlled by at least one control unit.

The gearshifting process is characterized in that the control unit limits the power tapping at the power take off during at least a part of the gearshifting process when the intermediate shaft is disconnected from the drive wheels of the vehicle with a view to limiting the torque load of the power take off across said transmission.

The limitation of the power tapping at the power take off lessens the torque load over the engaging/disengaging device of the transmission and thereby reduces the force required to disconnect the engaging/disengaging device, so that the transmission can be brought to a neutral position in which the power take off is disconnected from the output shaft of the transmission without comfort problems and without wear to the engagement/disengagement mechanism in the transmission. With the invention, it is therefore possible to shift gear when the vehicle is in motion, even when a coupling-dependent power take off is engaged and the starting position is that power is being tapped from the power take off. The facility to shift gear whilst the coupling-dependent power take off is engaged and the vehicle is in motion increases the number of possible types of auxiliary units which can be installed in the vehicle.

The second process according to the invention describes an automatic disengagement process of a coupling-dependent power take off in a vehicle when the vehicle is in motion. The power take off is driven by an engine disposed in the vehicle via a clutch, which, in turn, is coupled to an automatic step-geared transmission which drives the power take off. The transmission, the engine and the power take off are controlled by at least one control unit. The disengagement process comprises the steps: control unit limits the power tapping at the power take off; control unit disengages the power take off.

The advantage with the second process according to the invention is that the limitation of the power tapping from the power take off by the control unit lessens the applied torque and hence reduces the force required to disconnect the engaging/disengaging device of the power take off. The second process according to the invention therefore enables the control unit better to disengage the power take off when the vehicle is in motion, even when a coupling-dependent power take off is engaged and the starting position is that power is being tapped from the power take off.

According to one embodiment of the invention, the disengagement process comprises the steps: control unit limits the power tapping at the power take off; control unit disconnects the engine from the transmission; —the control unit puts the transmission into neutral position so that the power take off is disconnected from the drive wheels of the vehicle; control unit disengages the power take off.

The advantage with this embodiment is that the disconnection of the power take off both from the engine and from the drive wheels by the control unit ensures that only a very small torque loads the engaging device of the power take off as it is disconnected. The disconnection from the drive wheels can be realized by the power take off being disconnected from a main shaft disposed in the transmission or by a range gear disposed in the transmission being put into neutral position.

In a preferred embodiment based on any one of the above-stated processes, the control unit brings down the power tapping at the power take off to a minimum, i.e., zero power tapping or almost zero power tapping.

This ensures that the gear can be disengaged so that the transmission can assume neutral position and the control unit can engage a new gear and that the claw clutch can be disengaged. This produces increased comfort in the vehicle. A further advantage is that wear in the claw clutch and in the gear concerned is reduced.

In a further preferred embodiment based on any one of the above-stated processes, the gear and the claw clutch are respectively equipped with means for deterring accidental disengagement, i.e., coupling teeth with cutbacks, for example. The fact that, according to the invention, the control unit limits the power tapping from the power take off serves to reduce the applied torque and hence minimize the force required to disconnect the engaging/disengaging device of the gear and of the power take off respectively. It thereby becomes possible to shift gear or disengage the power take off even when the vehicle is in motion and despite the starting position being that power is being tapped from the power take off. It is therefore possible, with the aid of the processes according to the invention, to drive all types of unit by the coupling-dependent power take off in all gears, both forward and reverse, over the full speed register of the vehicle, irrespective of whether the vehicle is stationary or in motion. This also includes units which, according to the prior art, are required to be driven by a coupling-dependent power take off. Various configurations of units which are to be driven with power take off will hereby be easier to install in the vehicle.

BRIEF DESCRIPTION OF THE DRAWINGS

The present invention will be described in greater detail below with reference to the appended drawings, which, for illustrative purposes, show further preferred embodiments of the invention and the prior art.

DETAILED DESCRIPTION

Figure 1:
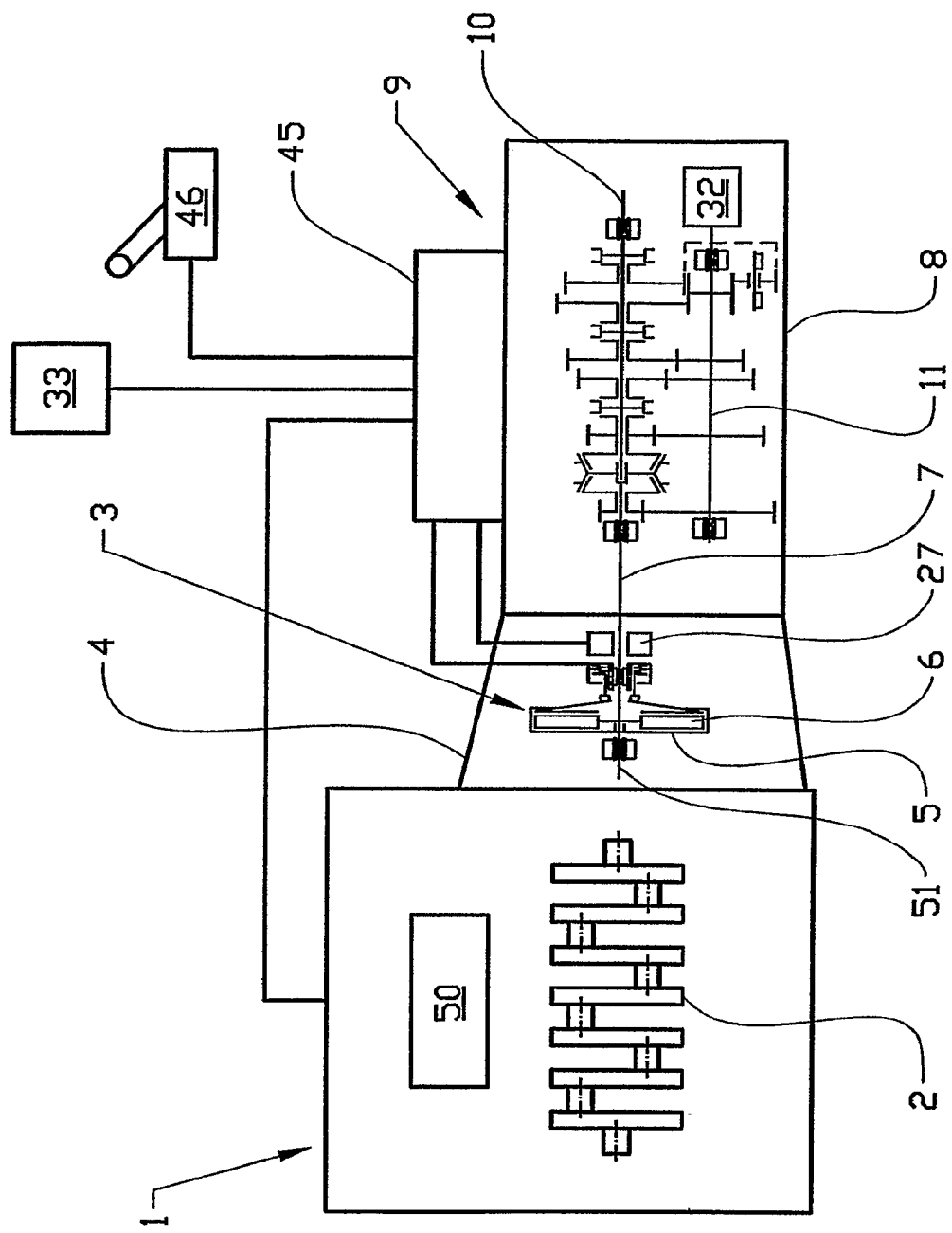
FIG. 1 shows a diagrammatic representation of an internal combustion engine with connecting clutch and transmission with power take off.

In FIG. 1, a six-cylinder internal combustion engine, for example a diesel engine, is denoted by 1, the crankshaft 2 of which is coupled to a single-disk dry plate clutch denoted generally by 3, which is enclosed in a clutch case 4. The crankshaft 2 is non-rotatably connected by the output shaft 51 of the engine, which is connected with the flywheel (not shown), to the clutch housing 5 of the plate clutch 3, whilst the plate disk 6 thereof is non-rotatably connected to an input shaft which is rotatably mounted in the housing 8 of a transmission denoted generally by 9.

Also rotatably mounted in the housing 8 are a main shaft 10 and an intermediate shaft 11.

Figure 2:
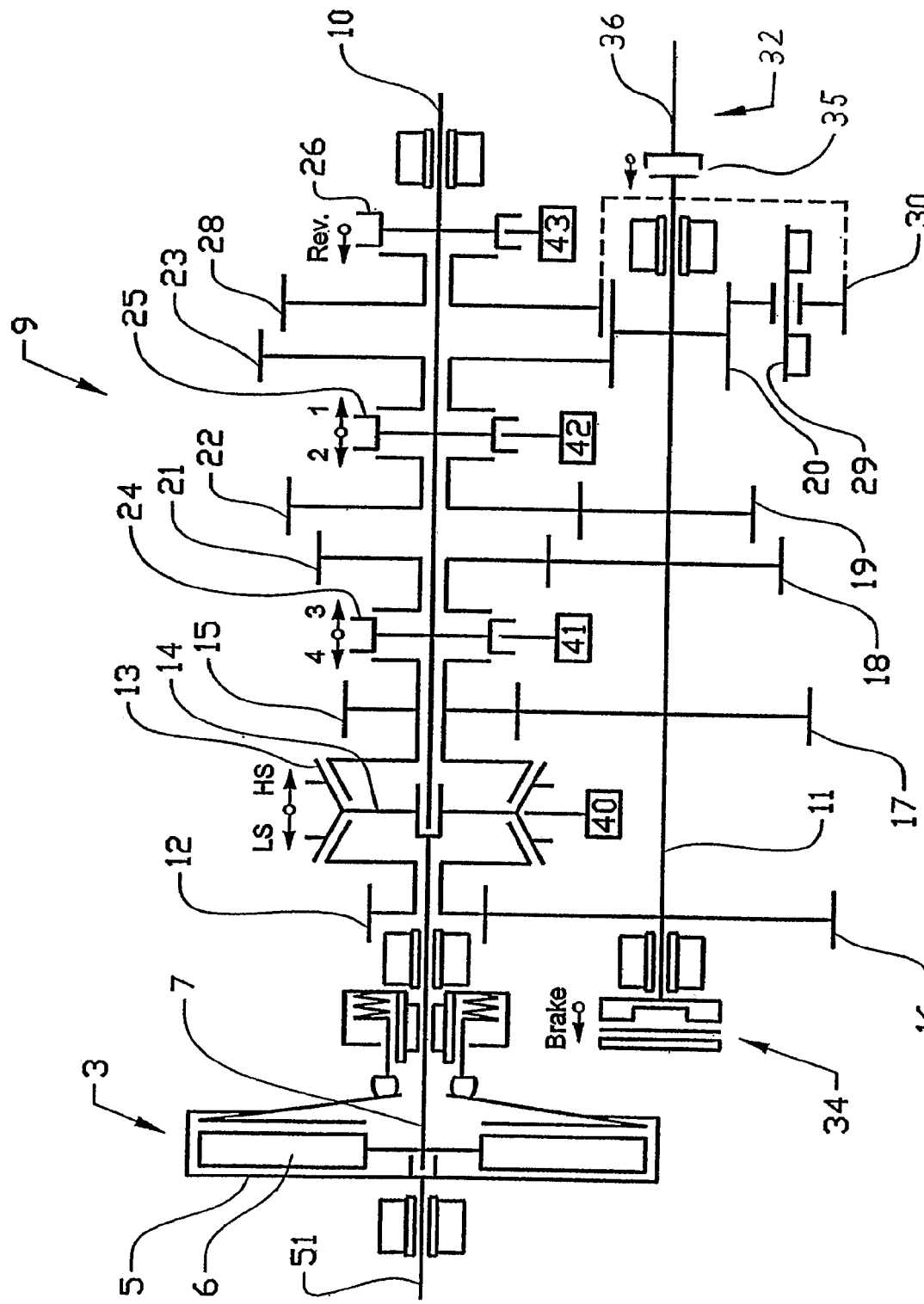
FIG. 2 shows the clutch and the transmission in FIG. 1 on an enlarged scale.

As is most clearly apparent from FIG. 2, a gear wheel 12 is rotatably mounted on the input shaft 7 such that it can be locked on the shaft with the aid of a coupling sleeve 13, which is provided with synchronizing members and is mounted in a non-rotatable yet axially displaceable manner on a hub 14 non-rotatably connected to the input shaft 7. With the aid of the coupling sleeve 13, a gear wheel 15 rotatably mounted on the main shaft 10 is also lockable relative to the input shaft 7. With the coupling sleeve 13 in a middle position, both of the gear wheels 12 and 15 are disconnected from their respective shafts 7 and 10. The gear wheels 12 and 15 mesh with respective gear wheels 16 and 17, which are non-rotatably connected to the intermediate shaft 11. Disposed in a rotationally secure manner on the intermediate shaft 11 are further gear wheels 18, 19 and 20, which mesh with respective gear wheels 21, 22 and 23 which are rotatably mounted on the main shaft 10 and can be locked on the main shaft with the aid of coupling sleeves 24 and 25, which in the shown illustrative embodiment have no synchronizing devices. A further gear wheel 28 is rotatably mounted on the main shaft 10 and meshes with an intermediate gear wheel 30 which is mounted rotatably on a separate shaft 29 and which, in turn, meshes with the intermediate shaft gear wheel 20. The gear wheel 28 can be locked on its shaft with the aid of a coupling sleeve 26.

The gear wheel pairs 12, 16 and 15, 17, and the coupling sleeve 13, form a synchronized splitter gear having a low-gear step LS and a high-gear step HS. The gear wheel pair 15, 17 also forms, together with the gear wheel pairs 21, 18, 22, 19, 23, 20 and the three gear wheels 28, 20 and 30, a basic transmission having four forward gears and one reverse gear.

In the shown illustrative embodiment, the output end of the main shaft 10 is directly connected to the cardan shaft (not shown). In an alternative illustrative embodiment, the main shaft 10 can be coupled to the cardan shaft via, for example, a range gear step of the planetary type.

The coupling sleeves 13, 24, 25 and 26 are displaceable as shown by the arrows in FIG. 2, producing the gear steps shown adjacent to the arrows. The respective coupling sleeve 13, 24, 25 has three positions, two gear positions and one neutral position (the middle position). The coupling sleeve 26 has one gear position and one neutral position. The displacement of the respective coupling sleeve is achieved with servo elements (actuators) 40, 41, 42 and 43, indicated diagrammatically in FIG. 2, which can be pneumatically operated piston cylinder devices of the type utilized in a transmission of the kind described above, which is marketed under the designation The servo elements 40, 41, 42 and 43 are controlled by an electronic control unit 45 (see FIG. 1), comprising a microcomputer, in dependence on signals fed into the control unit and representing various engine and vehicle data, which at least comprise engine speed, vehicle speed, gas pedal position and, where appropriate, engine brake on-off, when an electronic gear selector 46, coupled to the control unit 45, is in its automatic gear position. When the selector is in the manual gearshift position, the gearshift is effected on command of the driver via the gear selector 46.

The control unit 45 can request engine speed engine torque of the engine control unit 50 controlling the fuel injection.

In FIGS. 1 and 2, 32 denotes a coupling-dependent power take off coupled to the intermediate shaft 11.

The power take off usually consists of a housing (not shown) mounted on the side or rear end face of the transmission 9. The input shaft 36 of the power take off 32 can be connected by an engagement and disengaging device 35 in a rotationally secure manner to the intermediate shaft. 11. The engagement and disengaging device 35 of the power take off 32 is controlled by the control unit 45. The control unit 45 receives a request for engagement and disengagement of the power take off 32 from a device 33 for controlling the power take off 32, which device 33 is connected to the control unit 45.

The device 33 can be a control which is regulated by the driver of the vehicle, or an automatic arrangement which, via some form of sensor, for example, detects a parameter variation, thereby initiating engagement or disengagement of the power take off 32. When the power take off 32 is engaged, it is therefore driven by the engine 1 via the plate clutch 3, splitter gear 12, 16 or 15, 17 and the intermediate shaft 11. The power take off 32 is usually equipped with one or more gearing facilities on the at least one output shaft (not shown) of the power take off. To the output shaft of the power take off 32 there is coupled a desired unit, which is to be driven.

According to one embodiment of the process according to the invention, gearshifting is enabled when the coupling-dependent power take off is engaged and the vehicle is in motion and when, prior to the gearshifting, power is tapped from the power take off.

According to this embodiment of the invention, the control unit 45 is programmed to register that the power take off 32 is engaged. This can be done by sensors (not shown) for detecting whether the power take off 32 is engaged or disengaged, or in another known manner, for example by registering the status of the device 33 for controlling the power take off 32.

When the control unit 45 registers that the power take off 32 is engaged, the control unit 45 controls the transmission 9 according to the gearshifting process according to the invention. When the control unit 45, according to the gearshifting process according to the invention, decides on a gearshift, for example from gear 3 to gear 4, the control unit 45 limits the power tapping at the power take off 32 to a minimum by controlling an apparatus connected up to the power take off, for example in the form of a hydraulic pump (not shown) driving an optional auxiliary unit (not shown).

The hydraulic pump can be controlled in such a way that the control unit 45 fully opens a bypass valve disposed in the hydraulic pump. The power tapping, and hence the torque which contributes to the resultant force acting in the direction of engagement of the coupling ring 24, i.e., towards 3rd gear, is thereby minimized. Once the power tapping at the power take off 32 is minimized, the control unit 45 controls the speed of the engine 1 so that the input shaft 7 becomes torqueless. Torque registration in the input shaft 7 of the transmission 9 can be realized with the aid of a torque transmitter 27 disposed on the input shaft 7, or alternatively on the basis of engine torque calculated from the supplied quantity of fuel, with deduction for engine friction and other losses encumbering the engine 1 (generator, cooling fan, coupling-independent power take off). By knowing the torque on the input shaft 7 of the transmission, it is possible to control the torque of the engine 1 so that the input shaft is torqueless or almost torqueless.

Once the input shaft 7 is torqueless and the contributory torque of the power take off has been minimized, the 3rd gear in the basic transmission can be disengaged easily and with minimal wear upon the component parts of the particular gear. The transmission is therefore in its neutral position, i.e., the intermediate shaft 11 is disconnected from the drive wheels of the vehicle and the power take off 32 continues to be driven by the engine 1 via the clutch 3, the input shaft 7 of the transmission and the intermediate shaft 11. There will however be an interruption in the driving of the auxiliary unit, since the bypass valve of the hydraulic pump is temporarily fully opened.

If, after the transmission 9 has been put in neutral position, the control unit 45 decides to engage 4th gear, then the control unit 45 controls the speed of the engine 1 so that the speed of the engine 1 and of the intermediate shaft 11 becomes synchronous with the 4th gear. The control unit 45 delivers a signal in a known manner to, in this case, a servo element 41 to engage 4th gear. Registration of when synchronous speed has been achieved is realized in known fashion, for example by a tachometer (not shown).

Once 4th gear is engaged, the control unit 45 restores the previous level for the power tapping at the power take off 32. The control unit 45 therefore closes the bypass valve to the position which it had prior to commencement of the gearshifting.

In an alternative method for carrying out the gearshift, the control unit 45, after the transmission has been put in neutral position and, moreover, the plate clutch 3 has been disconnected, can synchronize the speed of the intermediate shaft 11 to the speed of the main shaft 10 by controlling an intermediate shaft brake 34. The intermediate shaft 11 can be braked with both the power take off 32 and the intermediate shaft brake 34, or just one of the power take off 32 and the intermediate shaft brake 34.

In another alternative embodiment, 4th gear or all the gears in the basic transmission are synchronized (not shown). The speed adjustment to a chosen gear is effected, in this case, with the aid of mechanical synchronizing devices which are disposed on each gear and are known per se, in the form of, for example, synchronizing rings with associated synchronizing parts. Such a synchronizing device is indicated in the figures by the conical coupling sleeve 13, which forms part of the synchronized splitter gear 12, 13, 14, 15.

According to a further embodiment of the process according to the invention, disengagement of the coupling-dependent power take off is enabled when the vehicle is in motion and when, prior to the disengagement, power is tapped from the power take off.

Here too, the control unit 45 can be programmed to register that the power take off 32 is engaged. The control unit 45 registers a request for disengagement of the power take off 32 from the device 33 for controlling the power take off 32. The control unit 45 limits the power tapping at the power take off 32 according to the above, so that the torque on the engaging/disengaging device 35, which can be constituted by a claw clutch, is minimized. After this, the control unit 45 disengages the power take off with minimized wear and with minimal torque effect.

In a further embodiment of the process according to the invention, disengagement of the coupling-dependent power take off is enabled, as in the abovementioned embodiment, when the vehicle is in motion and when, prior to the disengagement, power is tapped from the power take off 32. According to this process, the power take off 32 is disengaged in association with the transmission 9 being brought into a neutral position.

This process can advantageously be used under the same procedure as a gearshift in the transmission 9. The process is registered by following a gearshift from 3rd gear into 4th gear.

The control unit 45 registers that disengagement of the power take off 32 is requested. The control unit 45 limits the power tapping at the power take off 32 to a minimum. The control unit 45 decides to shift from 3rd gear to 4th. The control unit 45 then controls the engine 1 so that the input shaft 7 becomes as torqueless as possible. The control unit 45 disconnects the engine 1 from the transmission 9 by disengagement of the plate clutch 3. In an alternative embodiment of the invention, the engine 1 is disconnected from the transmission 9 by the splitter gear 12, 13, 14, 15 being put into its neutral position. When the engine 1 has been disconnected from the transmission 9, the control unit 45 disengages 3rd gear and the transmission 9 is in its neutral position. The control unit then disengages the power take off 32. After this, the control unit 45 couples together the engine 1 and the transmission 9. The control unit 45 controls the speed of the engine 1 so that the speed of the engine 1 and of the intermediate shaft 11 becomes synchronous with the 4th gear. The control system 45 delivers a signal in a known manner to, in this case, a servo element 41 to engage 4th gear.

The gearshift of a transmission equipped with a range gearing is realized preferably the range gearshift parallel with the gearshift of a basic gear, i.e., when the transmission 9 is in neutral position. The range gearshift per se is realized in a known manner simultaneous with a basic gearshift according to the above-described processes according to the invention. According to an advantageous embodiment of the invention, the control unit 45 is programmed to adjust the gear selection in the basic transmission with regard to equipment (not shown) driven by the power take off 32 and the rest of the current or future state of the vehicle.

According to an alternative embodiment of the invention, the control unit 45 is programmed to limit the power tapping of the power take off in all gearshifts, regardless of whether the power take off 32 is engaged or not, alternatively the control unit 45 can be programmed to limit the power tapping of the power take off 32 only in those gearshifts when the power take off 32 is engaged. The control unit 45 can also be programmed such that the power tapping of the power take off 32 is limited only during gearshifts between certain gear steps, for example so that the power tapping of the power take off 32 is not limited in a gearshift involving only the splitter gear 12, 13, 14, 15 of the transmission 9.

In an alternative embodiment of the invention, the transmission 9 can be put into neutral position by a range gear (not shown) disposed in the transmission being put into its neutral position. The intermediate shaft 11 is therefore disconnected from the drive wheels of the vehicle.

The invention can also be applied to transmissions without splitter gear.

The gearshifting process for the transmission or the disengagements of the power take off according to the invention can be realized by the execution of a computer program in a data processor disposed in the control unit 45.

A computer program according to the invention comprises a program code for, with a device disposed in the vehicle and in a predefined manner, gearshifting of the transmission 9 with engaged coupling-dependent power take off 32 or disengaging a coupling-dependent power take off 32 when a program is executed by a data processor integrated in or coupled to any of the control units of the vehicle.

The computer program according to the invention can be stored on a medium which is readable by a computer system integrated in the device. This medium can be, for example, a data diskette, a memory module, a CD or the like. This can be advantageous, for example, when the program is to be downloaded in the vehicle in production when the program in the vehicle is to be updated. The updating of software can take place, for example, at scheduled services or, if so desired, directly by a customer. The updating of software can also be realized via a connection, for example by internet, to a server in which the program is stored.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention should not be deemed to be limited to the illustrative embodiments described above, but rather a number of further variants and modifications are conceivable within the scope of the following patent claims.

What is claimed is:

1. A computer-implemented automatic gearshifting process for a vehicle with an engaged coupling-dependent power take off when the vehicle is in motion, the power take off being driven by an engine disposed in the vehicle via at least one clutch which, in turn, is coupled to an automatic step-geared transmission in which there is disposed at least one intermediate shaft, the intermediate shaft driving the power take off, wherein the transmission, the engine, and the power take off are controlled with at least one control unit, comprising:
    limiting power tapping at the power take off during at least a part of the gearshifting process when the intermediate shaft is disconnected from drive wheels of the vehicle so as to limit a torque load of the power take off across the transmission.

2. The computer-implemented automatic gearshifting process as claimed in claim 1, comprising disconnecting the intermediate shaft from the drive wheels of the vehicle by disconnecting the intermediate shaft from a main shaft disposed in the transmission.

3. The computer-implemented automatic gearshifting process as claimed in claim 1, wherein at least one gear in the transmission comprises means for preventing unwanted disengagement in the transfer of torque at the gear.

4. The computer-implemented automatic gearshifting process as claimed in claim 1, wherein the disengagement preventing means comprises coupling teeth belonging to a coupling sleeve of the gear and to an interacting coupling ring respectively, the coupling teeth being tapered such that mutually facing ends of the teeth are wider than parts of the teeth remote from the ends.

5. The computer-implemented automatic gearshifting process as claimed in claim 1, comprising limiting power tapping at power take off to zero or almost zero.

6. A computer readable medium comprising a computer program for implementing the method as claimed in claim 1 when the computer program is executed on a computer.

7. A computer program product comprising a program code stored on a medium which is readable by a computer, for implementing the method as claimed in claim 1 when the computer program is executed on the computer.

8. A computer program product directly loadable into an internal memory in a computer, comprising a computer program for implementing the method as claimed in claim 1, when the computer program product is executed on the computer.

* * * * *

UNITED STATES PATENT AND TRADEMARK OFFICE
CERTIFICATE OF CORRECTION

PATENT NO. : 7,487,025 B2  Page 1 of 1
APPLICATION NO. : 11/419512
DATED : February 3, 2009
INVENTOR(S) : Marcus Steen et al.

It is certified that error appears in the above-identified patent and that said Letters Patent is hereby corrected as shown below:

On the Title Page, Item (73)
Change Assignee name from "Volvo Lastvagnor AB" to --Volvo Lastvagnar AB--.

Signed and Sealed this

Twenty-fourth Day of March, 2009

JOHN DOLL
*Acting Director of the United States Patent and Trademark Office*